(12) United States Patent
Nguyen

(10) Patent No.: US 11,068,767 B2
(45) Date of Patent: Jul. 20, 2021

(54) PATTERNED SMART CARD MODULE, SMART CARD INCLUDING THE PATTERNED SMART CARD MODULE, METHOD FOR MANUFACTURING THE PATTERNED SMART CARD MODULE, AND METHOD OF VERIFYING AUTHENTICATION OF THE PATTERNED SMART CARD MODULE

(71) Applicant: MK SMART JSC, Hanoi (VN)

(72) Inventor: Khang Trong Nguyen, Hanoi (VN)

(73) Assignee: MK SMART JSC, Hanoi (VN)

( * ) Notice: Subject to any disclaimer, the term of this patent is extended or adjusted under 35 U.S.C. 154(b) by 0 days.

(21) Appl. No.: 16/677,727

(22) Filed: Nov. 8, 2019

(65) Prior Publication Data

US 2020/0334509 A1 Oct. 22, 2020

(30) Foreign Application Priority Data

Apr. 18, 2019 (VN) .............................. 1-2019-01932

(51) Int. Cl.
*G06K 19/07* (2006.01)
*G05B 19/4099* (2006.01)
*G06F 21/44* (2013.01)
*G06K 19/06* (2006.01)

(52) U.S. Cl.
CPC ..... *G06K 19/0723* (2013.01); *G05B 19/4099* (2013.01); *G06F 21/44* (2013.01); *G06K 19/06037* (2013.01); *G05B 2219/45212* (2013.01)

(58) Field of Classification Search
CPC ................................................ G06K 19/0723

USPC .......................................................... 235/492
See application file for complete search history.

(56) References Cited

U.S. PATENT DOCUMENTS

| | | |
|---|---|---|
| 5,681,491 A | 10/1997 | Merlin |
| 6,049,055 A | 4/2000 | Fannash |
| 6,259,035 B1 | 7/2001 | Trüggelmann |
| 6,371,378 B1 | 4/2002 | Brunet |
| 2001/0018984 A1 | 9/2001 | Takeda et al. |
| 2008/0109883 A1* | 5/2008 | Hernoud .................. G06F 16/29 726/5 |
| 2010/0320276 A1 | 12/2010 | Dreyer |
| 2015/0112826 A1* | 4/2015 | Crutchfield, Jr. .. G06Q 30/0601 705/26.1 |
| 2015/0170188 A1* | 6/2015 | Santaella ........... G06Q 30/0229 705/14.3 |

(Continued)

FOREIGN PATENT DOCUMENTS

| | | |
|---|---|---|
| DE | 102010036057 A1 | 3/2012 |
| DE | 202017006593 U1 | 1/2018 |

(Continued)

OTHER PUBLICATIONS

Search Report issued to European counterpart application No. 19207837.6 by the EPO dated May 29, 2020.

(Continued)

*Primary Examiner* — Allyson N Trail

(57) ABSTRACT

A patterned smart card module includes a chip module and a patterned ink layer coated on a conductive surface of the chip module. The IC chip of the chip module stores chip data therein, and the chip data includes holder-related data. The patterned ink layer has a pattern relating to the holder-related data.

10 Claims, 3 Drawing Sheets

(56) References Cited

U.S. PATENT DOCUMENTS

| | | | |
|---|---|---|---|
| 2015/0287027 A1 | 10/2015 | Schmidt et al. | |
| 2016/0012465 A1* | 1/2016 | Sharp | G06Q 20/10 |
| | | | 705/14.17 |
| 2017/0364906 A1 | 12/2017 | Bae | |
| 2018/0154359 A1* | 6/2018 | Ueyama | G01N 1/00 |
| 2018/0218313 A1* | 8/2018 | Bartolucci | G06Q 10/087 |
| 2018/0353958 A1* | 12/2018 | Hinojosa | B01J 4/00 |

FOREIGN PATENT DOCUMENTS

| | | |
|---|---|---|
| EP | 2339511 A1 | 6/2011 |
| EP | 2612277 B1 | 4/2015 |
| EP | 3173982 A1 | 5/2017 |
| JP | H07314963 A | 12/1995 |

OTHER PUBLICATIONS

Search Report appended to an Office Action, which was issued to Vietnamese counterpart application No. 1-2019-01932 by the NOIP dated Nov. 30, 2020 with an English translation thereof.

* cited by examiner

PATTERNED SMART CARD MODULE, SMART CARD INCLUDING THE PATTERNED SMART CARD MODULE, METHOD FOR MANUFACTURING THE PATTERNED SMART CARD MODULE, AND METHOD OF VERIFYING AUTHENTICATION OF THE PATTERNED SMART CARD MODULE

CROSS-REFERENCE TO RELATED APPLICATION

This application claims priority of Vietnam Patent Application No. 1-2019-01932, filed on Apr. 18, 2019.

FIELD

The disclosure relates to a smart card module embedded with an integrated circuit (IC) chip, and more particularly to a patterned smart card module.

BACKGROUND

Conventional smart cards, such as credit cards, subscriber identification module (SIM) cards, health cards, social benefit cards, all kinds of IC cards and the like, each include an IC chip which is encapsulated by a chip module embedded in a plastic card body thereof, and, besides traditional contact communication, are nowadays usually capable of contactless operation, such as radio frequency identification (RFID) operation. When such a smart card is put in a pocket, there is a risk that data stored in the IC chip may be eavesdropped and extracted without the knowledge of the card holder using the contactless interface. In addition, the chip module usually has its contact pads exposed, which takes up a portion of the outer surface of the smart card that could otherwise have been used for providing other information, and which is somewhat visually uninteresting.

SUMMARY

Therefore, an object of the disclosure is to provide a patterned smart card module that can alleviate at least one of the drawbacks of the prior art.

According to the disclosure, the patterned smart card module includes a chip module and a patterned ink layer coated on a conductive surface of the chip module. The chip module is embedded with an IC chip storing chip data therein, and the conductive surface thereof is formed with a plurality of contact pads for a data reader to read the chip data stored in the chip module. The chip data includes holder-related data. The patterned ink layer has a pattern that relates to the holder-related data.

Another object of the disclosure is to provide a smart card that can alleviate at least one of the drawbacks of the prior art.

According to the disclosure, the smart card includes a card body, and a patterned smart card module that is embedded with an IC chip storing chip data therein and that is embedded in the card body. The patterned smart card module includes a chip module and a patterned ink layer coated on a conductive surface of the chip module. The chip module is embedded with the IC chip, and the conductive surface thereof is formed with a plurality of contact pads for a data reader to read the chip data stored in the chip module. The chip data includes holder-related data. The patterned ink layer has a pattern that relates to the holder-related data.

Yet another object of the disclosure is to provide a method for manufacturing a patterned smart card module. The method includes: providing a computer device that stores chip data to be written to an IC chip embedded within a smart card module, wherein the chip data includes holder-related data, and the smart card module includes a chip module that is embedded with the IC chip and that has a conductive surface formed with a plurality of contact pads, and a conductive ink layer coated on the conductive surface of the chip module; controlling, by the computer device, a laser engraving machine that is coupled to the computer device to engrave a pattern representing the holder-related data on the conductive ink layer of the smart card module so as to form a patterned ink layer and thus form the patterned smart card module; and controlling, by the computer device, a data writing machine that is coupled to the computer device to write the chip data into the IC chip embedded within the chip module.

Yet another object of the disclosure is to provide a method of verifying authentication of a patterned smart card module. The pattered smart card module includes: a chip module that is embedded with an IC chip storing chip data therein, and that has a conductive surface formed with a plurality of contact pads, the chip data including holder-related data; and a patterned ink layer coated on the conductive surface of the chip module, and having a pattern that relates to the holder-related data. The method includes: reading, by a data reader, the holder-related data from the IC chip of the chip module; capturing, by a camera device, an image of the patterned ink layer; obtaining, by a computer device, data represented by the pattern of the patterned ink layer based on the image captured by the camera device; and comparing, by a computer device, the data represented by the pattern and the holder-related data read from the IC chip of the chip module. The computer device is permitted to perform a next action related to the patterned smart card module when the data represented by the pattern matches the chip data read from the IC chip of the chip module.

BRIEF DESCRIPTION OF THE DRAWINGS

Other features and advantages of the disclosure will become apparent in the following detailed description of the embodiment (s) with reference to the accompanying drawings, of which.

DETAILED DESCRIPTION

Figure 1:
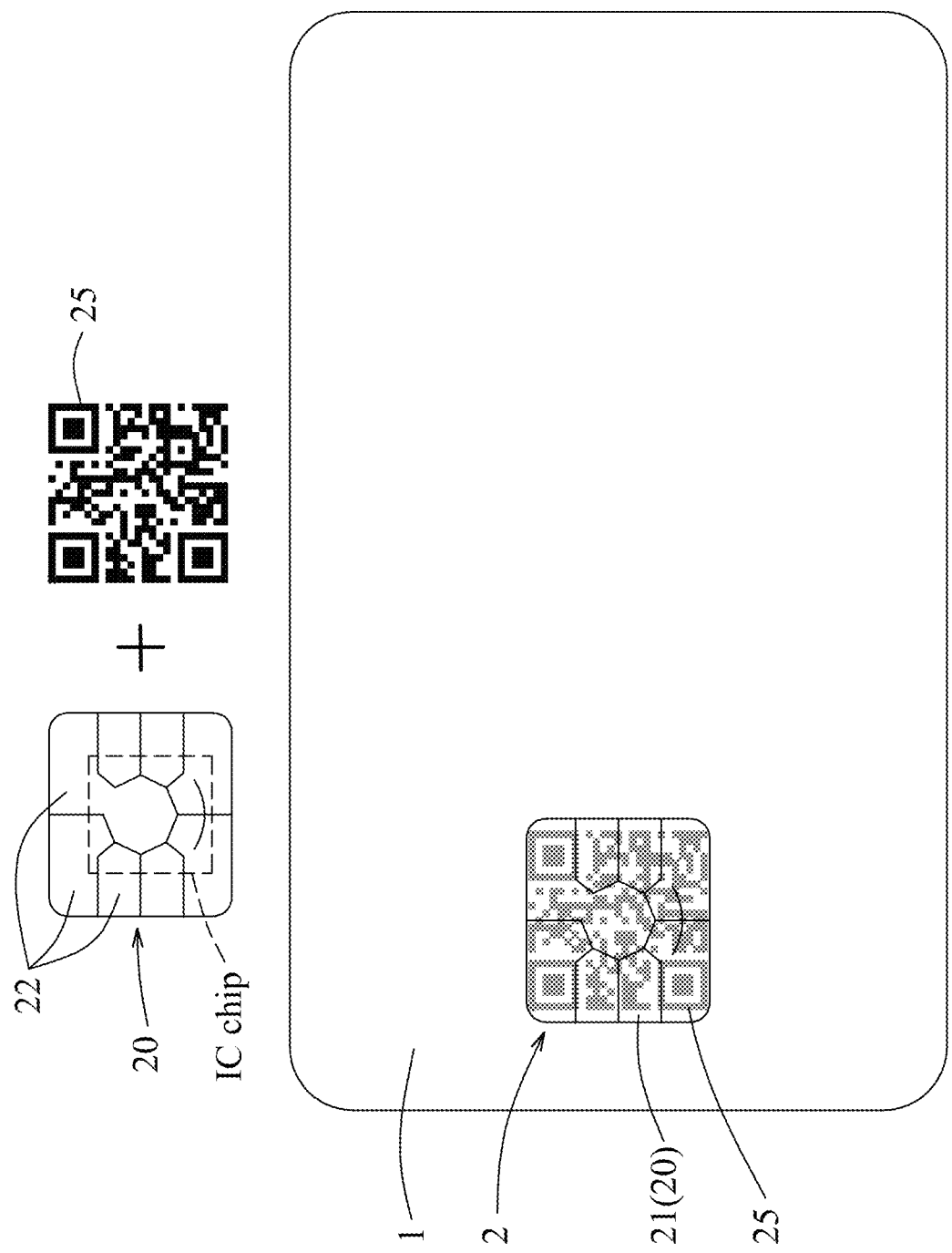
FIG. 1 is a schematic diagram illustrating an exemplary embodiment of a smart card according to the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Referring to FIG. 1, an embodiment of a smart card according to this disclosure is shown to include a card body 1 and a patterned smart card module 2 that encapsulates an IC chip therein and that is embedded in the card body 1. The smart card may be, for example, a credit card, a SIM card, a health card, a social benefit card, an ID card, etc., of which the card body 1 is usually made of plastic.

The patterned smart card module 2 is formed by a (bare) chip module 20 and a patterned ink layer 25. The chip module 20 is embedded with the IC chip therein, and has a conductive surface 21 (usually a metal surface, but not limited thereto) formed with a plurality of contact pads 22 for a data reader (not shown) to read chip data stored in the IC chip embedded in the chip module 20. The patterned ink layer 25 is coated on the conductive surface 21 of the chip module 20. In this embodiment, the chip data includes holder-related data which is related to a card holder of the smart card, and may be, for example, a name of the card holder, a telephone number of the card holder, administrative data for the card holder (e.g., keys, certificates, and so on), etc., but this disclosure is not limited in this respect. The patterned ink layer 25 has a pattern that relates to the holder-related data.

In practice, the conductive surface 21 of the chip module 20 is treated with a conductive ink to form a plain conductive ink layer thereon. Then, conventional laser engraving techniques may be used to form a desired pattern on the conductive ink layer to create the patterned ink layer 25 in a manner that the chip module 20 embedded with the IC chip can still function normally. In this embodiment, the patterned ink layer 25 is a semi-opaque colored layer, but this disclosure is not limited in this respect. In FIG. 1, the pattern is a two-dimensional barcode (e.g., a quick response (QR) code) containing the holder-related data, but this disclosure is not limited in this respect. In one example, the pattern may be characters that directly show the holder-related data by text. In one example, the pattern may represent an encrypted data piece that is generated by encrypting the holder-related data using, for example, data encryption standard (DES), advanced encryption standard (AES), and so on. In one example, the pattern may represent a tokenized data piece that is generated by tokenizing the holder-related data using a process known as "tokenization", which is used to substitute sensitive data with a token. Since the pattern represents the holder-related data, the patterned smart card module 2 can alone indicate the ownership thereof, and thus the card body 1 may be omitted in some embodiments, where the patterned smart card module 2 itself serves as the smart card, achieving miniaturization of the smart card. Moreover, in addition to representing the holder-related data, the pattern can have a personalized design in, for example, background images, background colors, etc., so that the patterned smart card module 2 can have a unique, personalized overall appearance.

In practice, the patterned ink layer 25 and the holder-related data are used for authentication or verification of the patterned smart card module 2. For example, when the patterned smart card module 2 is in use, a computer device is needed for reading the holder-related data and obtaining the data represented by the pattern of the patterned ink layer 25. The computer device is permitted to perform a next action related to the patterned smart card module 2 (e.g., registration, logging into a system, payment, reading of sensitive personal data or certificates, some kind of processing, or any action that requires authentication) only when the data represented by the patterned ink layer 25 matches the holder-related data.

In one implementation, the chip data that is stored in the smart card IC chip may include sensitive data (e.g., personal information of the card holder, a card number of a credit card, deposit information, etc.), and the holder-related data may be designed for the purpose authenticating access to the sensitive data by the data reader. For example, when a store clerk receives such a smart card that has the patterned smart card module 2, the store clerk may directly check identification or perform manual authentication/verification for the card holder via the pattern of the patterned smart card module 2. In another example, when a data reader (not shown) is used to read the sensitive data stored in the IC chip of the chip module 20, the data reader is first required to identify the data hidden in the pattern on the chip module 20 by at least image recognition (such as optical character recognition (OCR), QR code recognition, etc.). Accordingly, the data reader may include or be connected to a camera device to capture an image of the patterned ink layer 25 of the patterned smart card module 2 of the smart card, and may include a processing unit to obtain data represented by the pattern of the patterned ink layer 25 based on the image captured by the camera device. In case the pattern represents an encrypted data piece, the data reader may further need a decryption key to decrypt and identify the data hidden in the pattern. In case that the pattern represents a tokenized data piece, the data reader may need to be connected to a token service provider (TSP) for detokenizing the tokenized data piece, thereby identifying the data hidden in the pattern. Then, the data reader reads the holder-related data stored in the IC chip of the chip module 20, as part of the chip data, and compares the identified data with the holder-related data. The data reader is allowed to access the sensitive data only when the identified data matches the holder-related data. Accordingly, the sensitive data is accessible only when the card holder takes out the smart card for, as an example, completing a transaction, and would not be eavesdropped from an unauthorized contactless read operation when the smart card is put inside a pocket, a bag, or the like.

Figure 2:
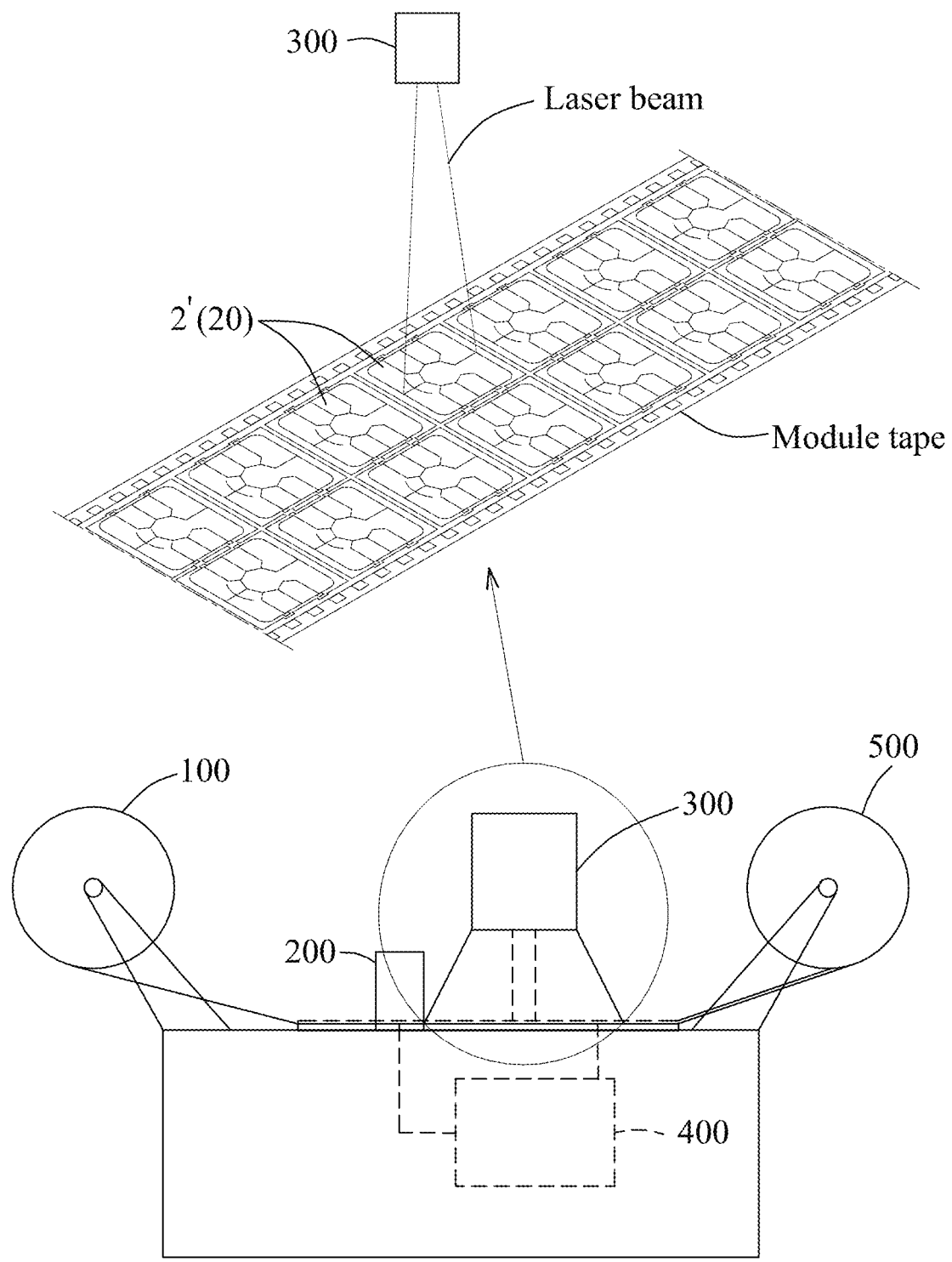
FIG. 2 is a schematic diagram illustrating a first exemplary system to manufacture a patterned smart card module according to the embodiment.

FIG. 2 shows a first exemplary system to manufacture the embodiment of the smart card according to this disclosure on a production line. The system includes an input roller 100 to which a blank module tape is mounted, a data writing machine 200, a laser engraving machine 300 (e.g., a fiber laser), a computer device 400 which is electrically coupled to the data writing machine 200 and the laser engraving machine 300, and an output roller 500. The blank module tape includes a plurality of blank smart card modules 2' each embedded with an IC chip therein, and formed by a blank (and bare) chip module 20 in which the IC chip is embedded and which is coated with a conductive ink layer thereon. The computer device 400 stores plural pieces of chip data corresponding to the blank chip modules 20. The input roller 100 and the output roller 500 cooperate to feed the blank module tape into the data writing machine 200, and the computer device 400 controls the data writing machine 200 to write, for each of the blank chip modules fed into the data writing machine 200, the corresponding chip data into the IC chip embedded in the blank chip module 20. The blank module tape with data-written chip modules 20 is then fed into the laser engraving machine 300, where the computer device 400 controls the laser engraving machine 300 to emit a laser beam towards the conductive ink layer coated on the data-written chip modules 20 to engrave, with respect to each of the data-written chip modules 20 fed thereinto and on the conductive ink layer, a pattern that relates to the holder-related data of the corresponding chip data, thereby forming the patterned ink layer 25 (see FIG. 1) and creating the (patterned) smart card module 2. It is noted that the computer device 400 processes the holder-related data to create the pattern (e.g., converting the holder-related data into a QR code, encrypting the holder-related data, and/or tokenizing the holder-related data) prior to the engraving process. Subsequently, the processed module tape including multiple patterned smart card modules 2 is fed by the output roller 500 to the next manufacturing station for performing processes such as cutting the patterned smart card modules 2 out of the module tape, and embedding the patterned smart card modules 2 into corresponding card bodies 1. It is noted that the order of the data writing and the laser engraving operations may be exchanged in other embodiments, and this disclosure is not limited in this respect.

Figure 3:
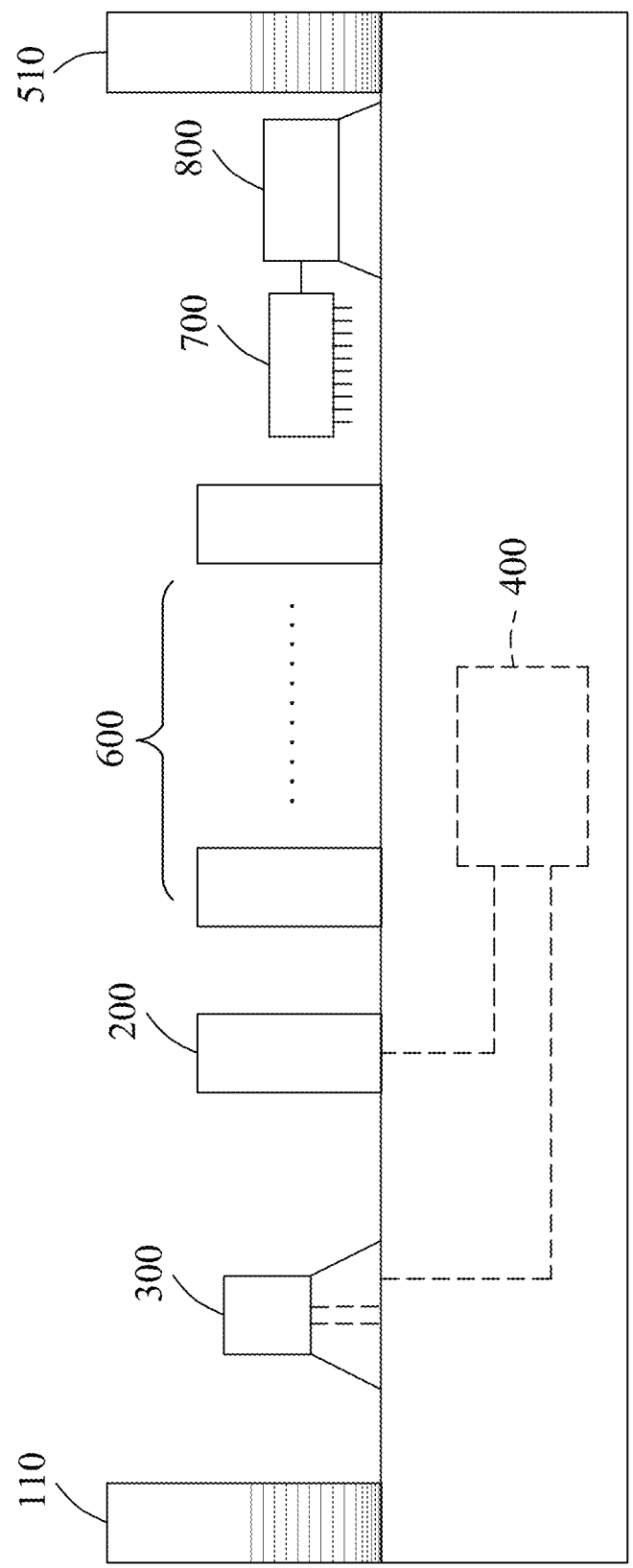
FIG. 3 is a schematic diagram illustrating a second exemplary system to manufacture a smart card according to the embodiment.

FIG. 3 shows a second exemplary system to manufacture the embodiment of the smart cards according to this disclosure on a production line. The system includes a card feeder 110, a laser engraving machine 300, a data writing machine 200, a computer device 400 which is electrically coupled to the data writing machine 200 and the laser engraving machine 300, a card treatment system 600, a data reading machine 700, an image inspecting machine 800, and an output tray 510. It is noted that the exemplary production line disclosed herein has an inspection station that includes the data reading machine 700 and the image inspecting machine 800, but in other production lines, the inspection station may be omitted. The card feeder 110 stores a plurality of blank smart cards, each of which is composed of a blank card body 1 (see FIG. 1) and a blank smart card module embedded in the blank card body 1. The blank smart card chip is formed by a blank (and bare) chip module 20 and a conductive ink layer coated on the blank chip module 20. The computer device 400 stores plural pieces of chip data corresponding to the blank chip modules 20. The card feeder 110 feeds the blank smart cards into the laser engraving machine 300, for example, one by one, and the computer device 400 controls the laser engraving machine 300 to emit a laser beam towards the conductive ink layers coated on the chip modules 20 to engrave, for each of the blank smart cards fed therein and on the conductive ink layer of the smart card chip of the blank smart card, a pattern that relates to the holder-related data of the corresponding chip data, so as to form the patterned ink layer 25 (see FIG. 1) and thus the (patterned) smart card module 2 (see FIG. 1) of the blank smart card. Then, the blank smart cards with the patterned smart card modules 2 are fed into the data writing machine 200, where the computer device 400 controls the data writing machine 200 to write, for each of the blank smart cards fed therein, corresponding chip data into the IC chip of the blank chip module 20 of the blank smart card. Subsequently, the smart cards with the blank card bodies 1 are sent to the card treatment system 600 for patterning the card bodies 1, so as to complete manufacturing of the smart cards. It is noted that the order of the laser engraving, the data writing, and the card treatment operations may be altered in other embodiments, and this disclosure is not limited in this respect.

In this exemplary production line, the finished smart cards may be subsequently sent to the inspection station. The data reading machine 700 is a data reader that reads, for each of the smart cards, the holder-related data of the chip data stored in the IC chip of the chip module 20 of the patterned smart card module 2 of the smart card using contact or contactless method. The image inspecting machine 800 includes a camera device to capture, for each of the smart cards, an image of the patterned ink layer 25 of the patterned smart card module 2 of the smart card, and includes a processing unit or a computer device to obtain data represented by the pattern of the patterned ink layer based on the image captured by the camera device. A computer device or a processor of the inspection station, which can be included in either the data reading machine 700 or the image inspecting machine 800, or be a separate computer device coupled to the data reading machine 700 and the image inspecting machine 800, then compares the data represented by the pattern and the holder-related data read from the IC chip of the chip module 20 for the smart card. The patterned smart card chip is sent to the next manufacturing station (e.g., the output tray 510 in this embodiment) when the data represented by the pattern matches the chip data read from the IC chip of the chip module 20, and may be removed from the production line or reworked when otherwise.

In summary, since the embodiment of the patterned smart card module 2 has the pattern representing the holder-related data on a surface thereof, the patterned smart card module 2 can alone show its ownership, and the card body 1 can be omitted, thereby miniaturizing a size of the smart card. In some implementations, since the data represented by the pattern represents the holder-related data which is stored in the IC chip of the chip module 20 and which is for authenticating access to the sensitive data, security for the data stored in the IC chip of the chip module 20 is enhanced.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A patterned smart card module, comprising:
    a chip module that is embedded with an integrated circuit (IC) chip storing chip data therein, and that has a conductive surface formed with a plurality of contact pads for a data reader to read the chip data stored in said chip module, the chip data including holder-related data; and
    a patterned ink layer coated on said conductive surface of said chip module, and having a pattern that relates to the holder-related data.

2. The patterned smart card module of claim 1, wherein the chip data further includes sensitive data, and the holder-related data is for authenticating access to the sensitive data by the data reader.

3. The patterned smart card module of claim 1, wherein said patterned ink layer is semi-opaque.

4. The patterned smart card module of claim 1, wherein the holder-related data is one of a name, a telephone number and other personal information of a holder of said patterned smart card module.

5. The patterned smart card module of claim 1, wherein said pattern is a two-dimensional barcode containing the holder-related data.

6. The patterned smart card module of claim 1, wherein said pattern represents an encrypted data piece that is generated by encrypting the holder-related data.

7. The patterned smart card module of claim 1, wherein said pattern represents a tokenized data piece that is generated by tokenizing the holder-related data.

8. A smart card comprising:
    a card body; and
    a patterned smart card module of claim 1, embedded in said card body.

9. A method for manufacturing a patterned smart card module, comprising:
    providing a computer device that stores chip data to be written to an integrated circuit (IC) chip embedded within a smart card module, wherein the chip data includes holder-related data, and the smart card module includes a chip module that is embedded with the IC chip and that has a conductive surface formed with a plurality of contact pads, and a conductive ink layer coated on the conductive surface of the chip module;
    controlling, by the computer device, a laser engraving machine that is coupled to the computer device to engrave a pattern representing the holder-related data on the conductive ink layer of the smart card module so as to form a patterned ink layer and thus form the patterned smart card module; and
    controlling, by the computer device, a data writing machine that is coupled to the computer device to write the chip data into the IC chip embedded within the chip module.

10. A method of verifying authentication of a patterned smart card module, the pattered smart card module including:
    a chip module that is embedded with an integrated circuit (IC) chip storing chip data therein, and that has a conductive surface formed with a plurality of contact pads, the chip data including holder-related data; and
    a patterned ink layer coated on the conductive surface of the chip module, and having a pattern that relates to the holder-related data,
    said method comprising:
        reading, by a data reader, the holder-related data from the IC chip of the chip module;
        capturing, by a camera device, an image of the patterned ink layer;
        obtaining, by a computer device, data represented by the pattern of the patterned ink layer based on the image captured by the camera device; and
        comparing, by the computer device, the data represented by the pattern and the holder-related data read from the IC chip of the chip module;
    wherein the computer device is permitted to perform a next action related to the patterned smart card module when the data represented by the pattern matches the chip data read from the IC chip of the chip module.

* * * * *